(12) United States Patent
Xiao

(10) Patent No.: US 10,204,288 B2
(45) Date of Patent: Feb. 12, 2019

(54) TARGET TRACKING WITH INTER-SUPERVISED CONVOLUTIONAL NETWORKS

(71) Applicant: ULSee Inc., Taipei (TW)

(72) Inventor: Jingjing Xiao, Beijing (CN)

(73) Assignee: ULSee Inc., Taipei (TW)

( * ) Notice: Subject to any disclaimer, the term of this patent is extended or adjusted under 35 U.S.C. 154(b) by 14 days.

(21) Appl. No.: 15/486,392

(22) Filed: Apr. 13, 2017

(65) Prior Publication Data

US 2018/0285692 A1 Oct. 4, 2018

(30) Foreign Application Priority Data

Mar. 28, 2017 (CN) .......................... 2017 1 0192346

(51) Int. Cl.
*G06K 9/46* (2006.01)
*G06K 9/62* (2006.01)
*G06T 7/70* (2017.01)

(52) U.S. Cl.
CPC ......... *G06K 9/6269* (2013.01); *G06K 9/4604* (2013.01); *G06T 7/70* (2017.01); *G06T 2210/12* (2013.01)

(58) Field of Classification Search
None
See application file for complete search history.

(56) References Cited

U.S. PATENT DOCUMENTS

| 8,121,346 B2 | 2/2012 | Williams |
| 9,008,840 B1 | 4/2015 | Ponulak et al. |
| 9,052,386 B2 | 6/2015 | Yeredor et al. |
| 9,269,012 B2 | 2/2016 | Fotland |
| 9,443,320 B1* | 9/2016 | Gaidon .................... G06K 9/00 |
| 2008/0154154 A1 | 6/2008 | Sarvazyan et al. |
| 2013/0051613 A1* | 2/2013 | Bobbitt .............. G06K 9/00771 382/103 |
| 2014/0241623 A1* | 8/2014 | Wang ................... G06K 9/6257 382/160 |
| 2017/0132472 A1* | 5/2017 | Tao ..................... G06K 9/00758 |
| 2018/0089505 A1* | 3/2018 | El-Khamy ................ G06T 7/11 |

OTHER PUBLICATIONS

Jingjing Xiao, Qiang Lan, Linbo Qiao and Ales Leonardis, Semantic tracking: Single-target tracking with inter-supervised convolutional networks, Nov. 19, 2016, 10 pages, arXiv:1611.06395v1, https://arxiv.org/abs/1611.06395.

* cited by examiner

*Primary Examiner* — Delomia L Gilliard
(74) *Attorney, Agent, or Firm* — Alan D. Kamrath; Kamrath IP Lawfirm, P.A.

(57) ABSTRACT

We propose a tracking framework that explicitly encodes both generic features and category-based features. The tracker consists of a shared convolutional network (NetS), which feeds into two parallel networks, NetC for classification and NetT for tracking. NetS is pre-trained on ImageNet to serve as a generic feature extractor across the different object categories for NetC and NetT. NetC utilizes those features within fully connected layers to classify the object category. NetT has multiple branches, corresponding to multiple categories, to distinguish the tracked object from the background. Since each branch in NetT is trained by the videos of a specific category or groups of similar categories, NetT encodes category-based features for tracking. During online tracking, NetC and NetT jointly determine the target regions with the right category and foreground labels for target estimation.

19 Claims, 4 Drawing Sheets

| Sample | NetC | NetT | outcome |
|---|---|---|---|
| Type I | Original | Foreground | For target estimation;For online updating(a posive sample) |
| Type II | Original | Foreground | An ambiguous sample |
| Type III | Other | background | |
| Type IV | Other | background | For online updating(a negative sample) |

Fig. 4

TARGET TRACKING WITH INTER-SUPERVISED CONVOLUTIONAL NETWORKS

FIELD OF THE DISCLOSURE

The present disclosure relates to an image processing technology, and more particularly to an image target tracking method and system thereof.

BACKGROUND OF THE INVENTION

Visual object tracking has actively been researched for several decades. Depending on the prior information about the target category, the tracking algorithms are usually classified as category-free methods and category-based methods. However, the prior works were developed using conventional handcrafted features, which have difficulties of being scaled up.

SUMMARY OF THE INVENTION

According to an exemplary embodiment, a system for target tracking comprising a semantic tracker is provided. The semantic tracker comprises: a shared convolutional network, extracting a plurality of generic features from a plurality of images among object categories; a classification network, connected to the shared convolutional network, generating object classification results based on the generic features; and a tracking network, connected to the shared convolutional network, tracking a target object based on the generic features.

According to an exemplary embodiment, one or more computer-readable storage media storing instructions which, when executed on a graphics card, cause the graphics card to perform a method, is provided. The method comprises: extracting a plurality of generic features from a plurality of images among object categories; generating object classification results based on the generic features; and tracking a target object based on the generic features.

According to an exemplary embodiment, a mobile device comprising computer-useable instructions that, when used by one or more computing devices, cause the one or more computing devices to perform operations is provided. The operations comprise: extracting a plurality of generic features from a plurality of images among object categories; generating object classification results based on the generic features; and tracking a target object based on the generic features.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a table showing possible outcomes based on the results of NetC classification network and NetT tracking network of each sample in accordance with some embodiments.

DESCRIPTION OF THE PREFERRED EMBODIMENTS

Figure 1:
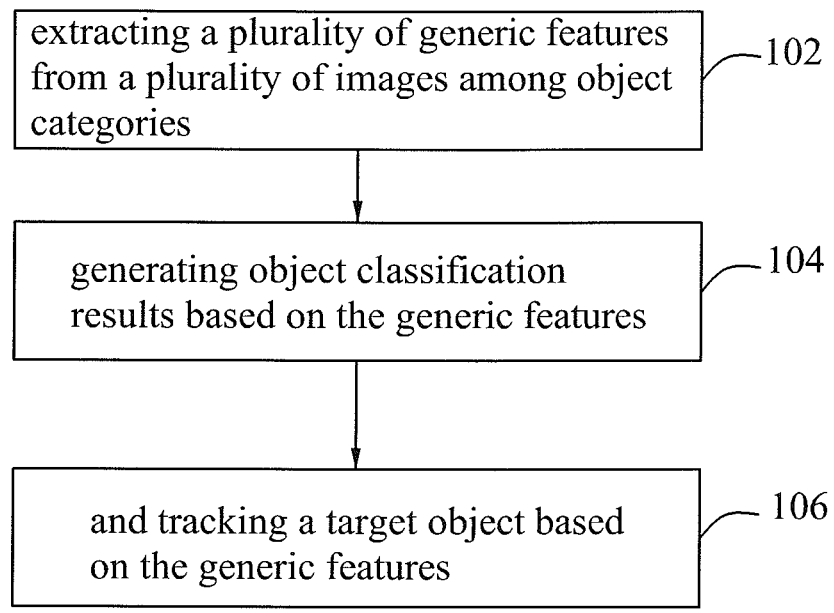
FIG. 1 is a flow chart for a method of target tracking in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

This article presents a semantic tracker that simultaneously tracks a single target and recognizes its category. In general, it is hard to design a tracking model suitable for all object categories, e.g., a rigid tracker for a car is not suitable for a deformable gymnast. Category-based trackers usually achieve superior tracking performance for the objects of that specific category, but have difficulties being generalized. Therefore, we propose a novel unified robust tracking framework that explicitly encodes both generic features and category-based features. The tracker consists of a shared convolutional network (NetS), which feeds into two parallel networks, NetC for classification and NetT for tracking. NetS is pre-trained on ImageNet to serve as a generic feature extractor across the different object categories for NetC and NetT. NetC utilizes those features within fully connected layers to classify the object category. NetT has multiple branches, corresponding to multiple categories, to distinguish the tracked object from the background. Since each branch in NetT is trained by the videos of a specific category or groups of similar categories, NetT encodes category-based features for tracking. During online tracking, NetC and NetT jointly determine the target regions with the right category and foreground labels for target estimation. To improve the robustness and precision, NetC and NetT inter-supervise each other and trigger network adaptation when their outputs are ambiguous for the same image regions (i.e., when the category label contradicts the foreground/background classification).

FIG. 1 is a flow chart for a method of target tracking in accordance with some embodiments. As shown in FIG. 1, a method 100 is provided. The method 100 includes the following operations: extracting a plurality of generic features from a plurality of images among object categories (102); generating object classification results based on the generic features (104); and tracking a target object based on the generic features (106).

The method 100 further comprises classifying the bounding box into the target object and a non-target object based on the generic features. The method 100 further comprises classifying the bounding box into a foreground and a background based on the generic features. The method 100 further comprises performing online updating and target estimation when classifying the bounding box into the target object and the foreground. The method 100 further comprises network inter-supervising and triggering network adaptation when classifying the bounding box into the non-target object and the foreground.

Figure 2:
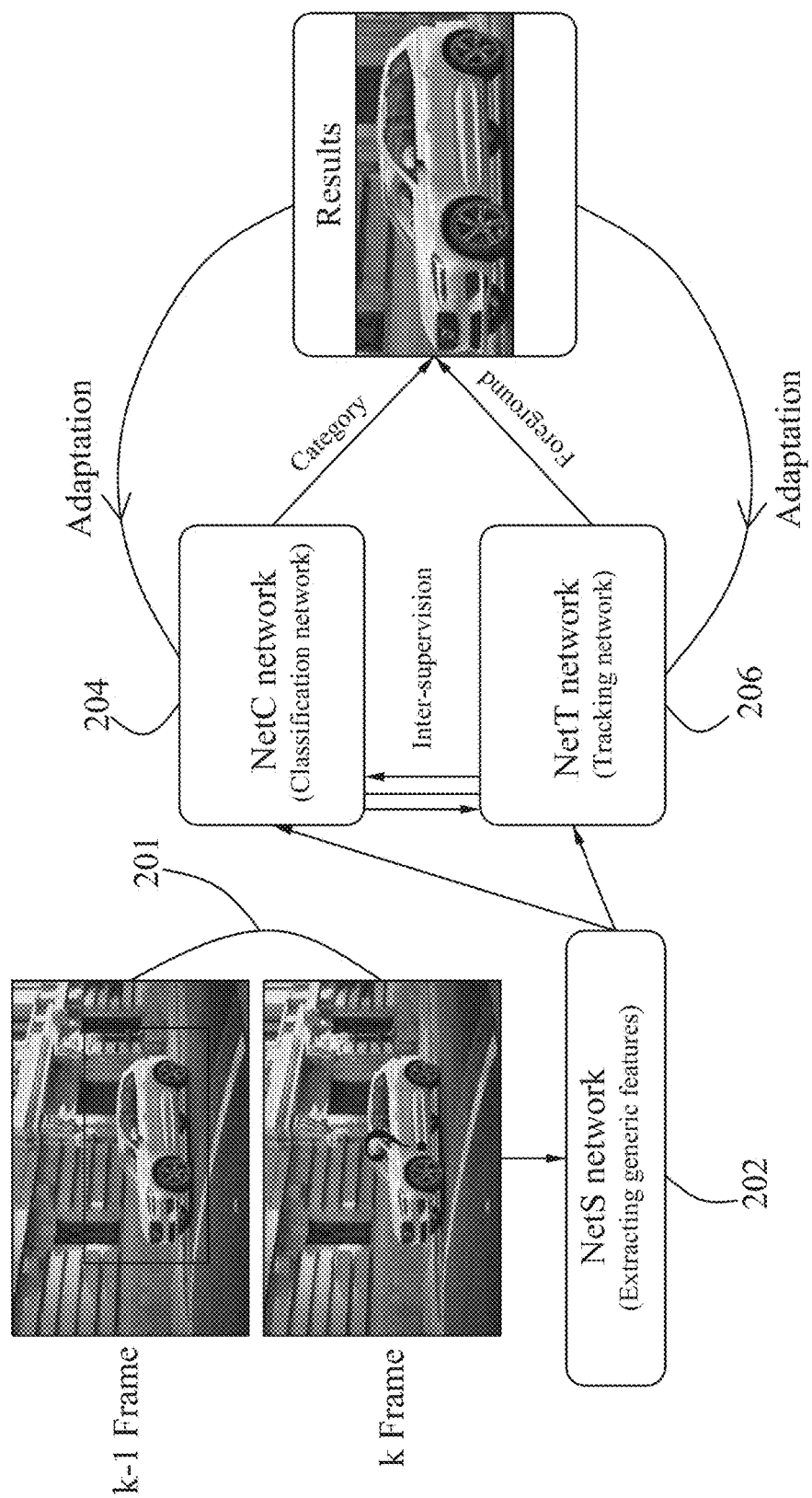
FIG. 2 is a block diagram of architecture of a semantic tracker in accordance with some embodiments.

FIG. 2 is a block diagram of architecture of a semantic tracker in accordance with some embodiments. The semantic tracker 200 comprises three stages: off-line training, online tracking, and network adaptation. The semantic tracker 200 includes a shared convolutional network (NetS) 202, a classification network (NetC) 204, and a tracking network (NetT) 206.

In the offline training stage, NetS 202 is pre-trained from ImageNet to extract generic features across different object categories. Those features are then fed into NetC 204 for classification and NetT 206 for tracking. Note that NetT 206 has multiple branches to distinguish the tracked object from the background. Since each branch is trained by the videos of a specific object category, this enables each branch in NetT 206 to learn the category-specific features related to both foreground and background, e.g., when tracking a pedestrian, it is more likely to learn the features of a car in the background than features of a fish.

During online tracking, NetC 204 first recognizes the object category and activates the corresponding branch in NetT 206. Then, NetT 206 is automatically fine-tuned for that particular tracking video by exploiting the foreground and the background sample regions in the first frame. When a new image frame arrives, the algorithm samples a set of image regions and each sample is fed through both NetC 204 and NetT 206. The regions with the right category and the foreground label are used for target estimation (i.e., the location and the size of the target bounding box). Note that the target appearance often changes during the tracking; therefore it is extremely crucial for a tracker to adapt the model accordingly.

To improve the robustness and precision, NetC 204 and NetT 206 inter-supervise each other and trigger network adaptation when their outputs are ambiguous (i.e., not consistent) for several image regions, e.g., when an image region is classified as a non-target category from NetC 204 but as foreground from NetT 206 or as a target category from NetC 204 and background from NetT 206. The samples with consistent labeling are used to update the networks that also result in a reduced number of ambiguous sample regions.

Different from conventional category-free and category-based trackers, the main contributions of our semantic tracker can be summarized as: (1) Our tracker simultaneously tracks a single target and recognizes its category using convolutional networks, which alleviates the problems with heuristic assumptions about the targets; (2) A novel unified framework with NetS 202 network, which extracts generic features across different object categories, combined with NetC 204 and NetT 206 networks which encode category-based features; (3) NetC 204 and NetT 206 jointly determine image samples for estimation of the target, and inter-supervise each other by triggering network adaptation to improve robustness and precision.

Figure 3:
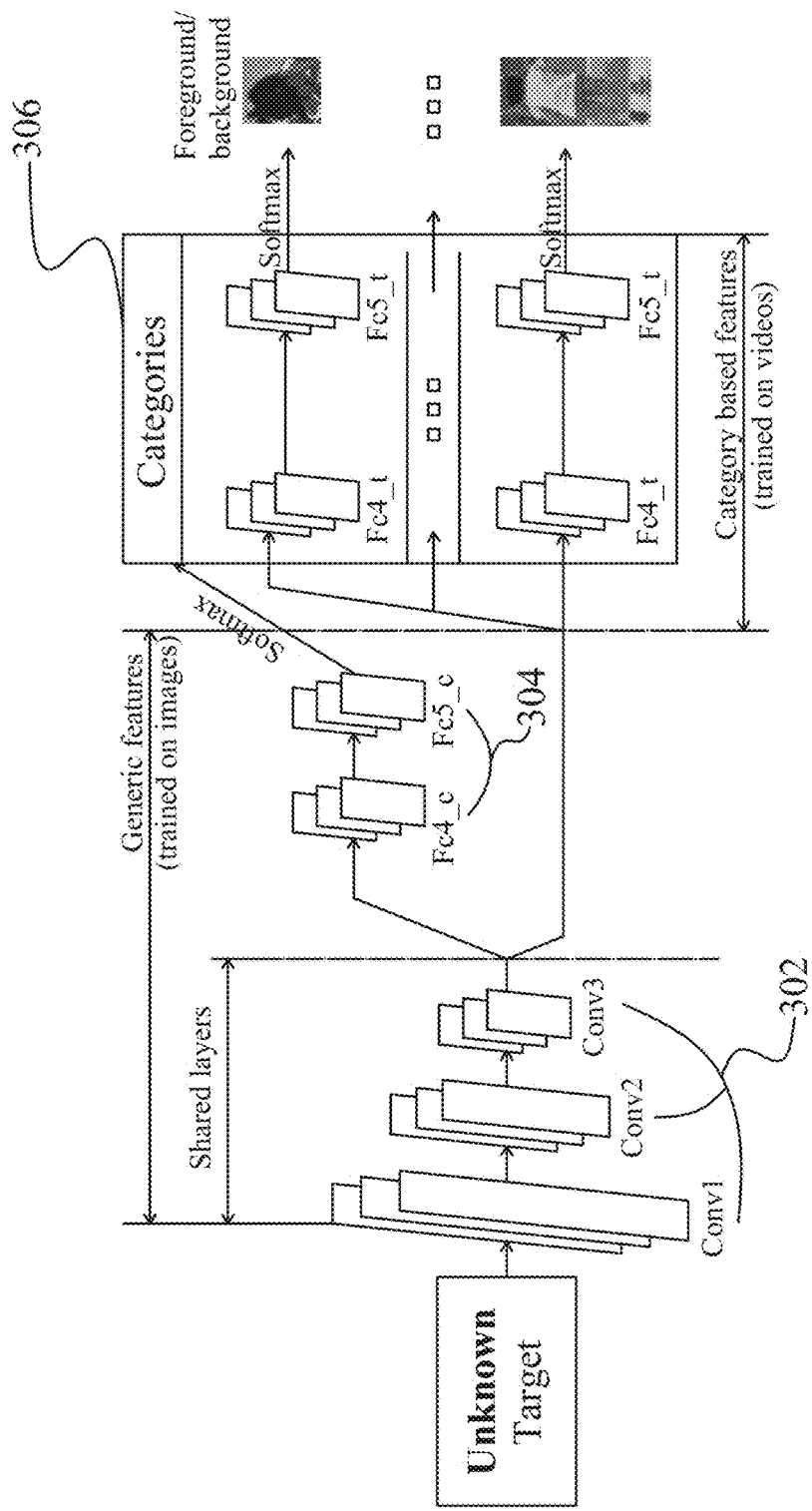
FIG. 3 is a detailed block diagram of architecture of a semantic tracker in accordance with some embodiments.

FIG. 3 is a detailed block diagram of architecture of a semantic tracker in accordance with some embodiments. A semantic tracker 300 includes shared convolutional layers to extract generic features in the shallow network (NetS) 302, followed by NetC network 304 for classification and NetT network 306 for extracting category-based features for tracking. Note that NetS 302 extracts generic features across different object categories, where those features have some common properties. Therefore, those extracted generic features are fed into NetC 304 and NetT 306 for more semantic related tasks. NetC 304 is a multi-class classification network to recognize the object category. NetT 306, which is a binary classification network, aims at distinguishing foreground region (target) from the background. Considering that the images of tracked objects of the same category often contain characteristic features both in terms of the foreground as well as the background, but which are different from other categories, e.g., when tracking a pedestrian it is more likely to have cars in the background than fish, NetT 306 comprises multiple category-based branches, and each branch is particularly trained from the videos that contain the same object category. During on-line tracking, NetC 304 and NetT 306 inter-supervise each other by triggering network adaptation to improve robustness and precision.

FIG. 4 is a table showing possible outcomes based on the results of NetC classification network and NetT tracking network of each sample in accordance with some embodiments. Please refer to FIG. 2 and FIG. 4. Samples classified as the original category from NetC 204 and foreground from NetT 206 are regarded as type I samples. Since type I samples obtain consistent (positive) labeling from NetC 204 and NetT 206, they are regarded as highly trustable target samples and are used to estimate the target. Note that the type IV samples (the same as the type I samples in FIG. 4) also obtain consistent labeling (in the case of the type IV they are negative) from both networks. Those samples with consistent labeling are used for later network adaptation when ambiguities occur as a result of NetC 204 and NetT 206 outputting contradictory results (type II and type III samples). As shown in FIG. 4, the algorithm detects ambiguous samples (AS) when inconsistent labeling arise from the outputs of NetC 204 and NetT 206, i.e., type II and type III samples. An increasing number of ambiguous samples (AS) indicates that the current networks have difficulties consistently classifying the incoming samples and should be updated. Since NetC 204 is not thoroughly pre-trained with fine-grained information, it may misclassify the object under some (new) conditions. Also, the initially trained foreground/background boundary of NetT 206 may not be reliable any more. Therefore, both NetC 204 and NetT 206 need to be updated with the most recent consistent samples. To update the networks, NetC 204 and NetT 206 use the consistent samples during the process, i.e., type I and type IV samples. While it is straightforward to use type I and type IV samples to update NetT 206, type IV samples do not have a validated category label to train a specific category in NetC 204. Therefore, type I samples are used to train the original category in NetC 204 while type IV samples are used to train the category X (unknown category) to update NetC 204.

In some embodiments, "original" in NetC 204 refers to "target object"; and "other" in NetC 204 refers to "non-target object".

According to an exemplary embodiment, a system for target tracking comprising a semantic tracker is provided.

The semantic tracker comprises: a shared convolutional network, extracting a plurality of generic features from a plurality of images among object categories; a classification network, connected to the shared convolutional network, generating object classification results based on the generic features; and a tracking network, connected to the shared convolutional network, tracking a target object based on the generic features.

In some embodiments, the classification network and the tracking network inter-supervise each other and trigger network adaptation. The shared convolutional network further extracts the generic features from a bounding box of one of the images. The classification network further classifies the bounding box into the target object and a non-target object based on the generic features. The tracking network further classifies the bounding box into a foreground and a background based on the generic features.

In some embodiments, the classification network classifies the bounding box as the target object and the tracking network classifies the bounding box as the foreground, the semantic tracker updates the classification network and the tracking network and tracks the target object. In some embodiments, the classification network classifies the bounding box as the non-target object and the tracking network classifies the bounding box as the background, the semantic tracker updates the classification network and the tracking network.

In some embodiments, the classification network classifies the bounding box as the non-target object and the tracking network classifies the bounding box as the foreground, the classification network and the tracking network inter-supervise each other and trigger network adaptation.

In some embodiments, the classification network classifies the bounding box as the target object and the tracking network classifies the bounding box as the background, the classification network and the tracking network inter-supervise each other and trigger network adaptation.

In some embodiments, the semantic tracker further performs category-based training during an offline training stage, determines the object category of the image and performing network adaptation during an online tracking stage. Each of the classification network and the tracking network comprises a plurality of fully connected layers. The images comprise at least one of video and pictures.

According to an exemplary embodiment, one or more computer-readable storage media storing instructions which, when executed on a graphics card, cause the graphics card to perform a method, is provided. The method comprises: extracting a plurality of generic features from a plurality of images among object categories; generating object classification results based on the generic features; and tracking a target object based on the generic features.

In some embodiments, the method further comprises classifying the bounding box into the target object and a non-target object based on the generic features. The method further comprises classifying the bounding box into a foreground and a background based on the generic features. The method further comprises performing online updating and target estimation when classifying the bounding box into the target object and the foreground.

In some embodiments, the method further comprises network inter-supervising and triggering network adaptation when classifying the bounding box into the non-target object and the foreground. The method further comprises network inter-supervising and triggering network adaptation when classifying the bounding box into the target object and the background.

According to an exemplary embodiment, a mobile device comprising computer-useable instructions that, when used by one or more computing devices, cause the one or more computing devices to perform operations is provided. The operations comprise: extracting a plurality of generic features from a plurality of images among object categories; generating object classification results based on the generic features; and tracking a target object based on the generic features.

The operations further comprise trigger network adaptation between a classification network and a tracking network.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for target tracking comprising a semantic tracker, the semantic tracker comprising:
   a shared convolutional network, extracting a plurality of generic features from a plurality of images among object categories;
   a classification network, connected to the shared convolutional network, generating object classification results based on the generic features; and
   a tracking network, connected to the shared convolutional network and having a plurality of branches, tracking a target object based on the generic features;
   wherein the semantic tracker further performs category-based training during an offline training stage, determines the object category of the image and performs network adaptation during an online tracking stage;
   wherein during the online tracking stage, the classification network first recognizes the object categories and activates the corresponding branch in the tracking network, and then the tracking network is automatically fine-tuned for that particular tracking video by exploiting foreground and background sample regions in a first frame;
   when a new image frame arrives, an algorithm samples a set of image regions and each sample is fed through both the classification network and the tracking network.

2. The system in claim 1, wherein the classification network and the tracking network inter-supervise each other and trigger network adaptation.

3. The system in claim 1, wherein the shared convolutional network further extracts the generic features from a bounding box of one of the images.

4. The system in claim 3, wherein the classification network further classifies the bounding box into the target object and a non-target object based on the generic features.

5. The system in claim 4, wherein the tracking network further classifies the bounding box into a foreground and a background based on the generic features.

6. The system in claim 5, wherein the classification network classifies the bounding box as the target object and the tracking network classifies the bounding box as the foreground, the semantic tracker updates the classification network and the tracking network and tracks the target object.

7. The system in claim 5, wherein the classification network classifies the bounding box as the non-target object and the tracking networkclassifies the bounding box as the background, the semantic tracker updates the classification network and the tracking network.

8. The system in claim 5, wherein the classification network classifies the bounding box as the non-target object and the tracking network classifies the bounding box as the foreground, the classification network and the tracking network inter-supervise each other and trigger network adaptation.

9. The system in claim 5, wherein the classification network classifies the bounding box as the target object and the tracking network classifies the bounding box as the background, the classification network and the tracking network inter-supervise each other and trigger network adaptation.

10. The system in claim 1, wherein each of the classification network and the tracking network comprises a plurality of fully connected layers.

11. The system in claim 1, wherein the images comprises at least one of video and pictures.

12. A non-transitory computer-readable storage medium storing instructions which,when executed on a graphics card, cause the graphics card to perform a method, the method comprising:
   extracting a plurality of generic features from a plurality of images among object categories;
   generating object classification results based on the generic features;
   tracking a target object based on the generic features;
   performing category-based training during an offline training stage, determining the object category of the image and performing network adaptation during an online tracking stage;
   during the online tracking stage, first recognizing the object categories and activating a corresponding branch in a tracking network, and then automatically fine-tuning the tracking network for that particular tracking video by exploiting foreground and background sample regions in a first frame; and
   when a new image frame arrives, sampling a set of image regions and feeding each sample through both a classification network and the tracking network.

13. The non-transitory computer-readable storage medium in claim 12, wherein the method further comprises classifying the bounding box into the target object and a non-target object based on the generic features.

14. The non-transitory computer-readable storage medium in claim 12, wherein the method furthercomprises classifying the bounding box into a foreground and a background based on the generic features.

15. The non-transitory computer-readable storage medium in claim 14, wherein the method further comprises performing online updating and target estimation when classifying the bounding box into the target object and the foreground.

16. The non-transitory computer-readable storage medium in claim 14, wherein the method further comprises network inter-supervising and triggering network adaptation when classifying the bounding box into the non-target object and the foreground.

17. The non-transitory computer-readable storage medium in claim 14, wherein the method further comprises network inter-supervising and triggering network adaptation when classifying the bounding box into the target object and the background.

18. A mobile device comprising computer-useable instructions that, when used by one or more computing devices, cause the one or more computing devices to perform operations comprising:
   extracting a plurality of generic features from a plurality of images among object categories;
   generating object classification results based on the generic features;
   tracking a target object based on the generic features;
   performing category-based training during an offline training stage, determining the object category of the image and performing network adaptation during an online tracking stage;
   during the online tracking stage, first recognizing the object categories and activating a corresponding branch in a tracking network, and then automatically fine-tuning the tracking network for that particular tracking video by exploiting foreground and background sample regions in a first frame; and
   when a new image frame arrives, sampling a set of image regions and feeding each sample through both a classification network and the tracking network.

19. The mobile device in claim 18, wherein the operations further comprises trigger network adaptation between a classification network and a tracking network.

* * * * *